Nov. 9, 1954

A. MARTIN 2,694,195

DEVICE FOR OPERATING A CONTROL OR WARNING
SYSTEM IN RESPONSE TO VARIATIONS
OF VALUE OF A VARIABLE FACTOR

Filed June 5, 1953

INVENTOR
ALphonse Martin
BY
Bailey, Stephens &Huttig
ATTORNEYS

Nov. 9, 1954

A. MARTIN 2,694,195

DEVICE FOR OPERATING A CONTROL OR WARNING SYSTEM IN RESPONSE TO VARIATIONS OF VALUE OF A VARIABLE FACTOR

Filed June 5, 1953

INVENTOR
Alphonse Martin
BY
Bailey, Stephens and Huettig
ATTORNEYS

United States Patent Office 2,694,195
Patented Nov. 9, 1954

2,694,195

DEVICE FOR OPERATING A CONTROL OR WARNING SYSTEM IN RESPONSE TO VARIATIONS OF VALUE OF A VARIABLE FACTOR

Alphonse Martin, Saint-Ouen, France

Application June 5, 1953, Serial No. 359,694

Claims priority, application France June 16, 1952

3 Claims. (Cl. 340—282)

The present invention relates to devices for operating a control or warning system in response to variations of the value of a variable factor, which value indication is given by the position of the movable index of a measurement apparatus. My invention is more especially although not exclusively concerned with devices for operating a control or warning system according as the factor above referred to is above or below a given limit value.

The chief object of my invention is to provide a device of this kind which is better adapted to meet the requirements of practice than those used up to the present time and, in particular, which is more sensitive and more resistant.

Preferred embodiments of my invention will be hereinafter described with reference to the accompanying drawings, given merely by way of example, and in which.

Figure 1:
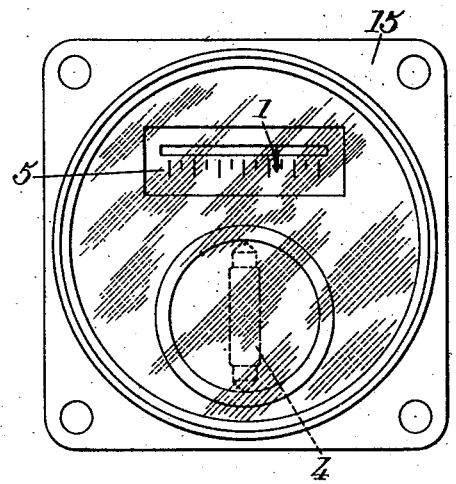
Figs. 1 and 2 are respectively a front view, and a side view with the cover removed, of a device according to my invention.
Figure 2:
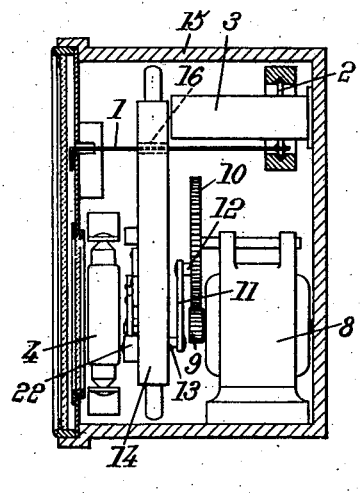

My invention relates to the device for operating warning or control means in response to variations of a factor which may be a physical magnitude such as temperature, pressure, altitude, speed, direction, a current electric characteristic (voltage, intensity, frequency, etc.), the value of an illumination, a hygrometric degree, etc.

This factor is measured by means of a measurement apparatus including a movable index and the space in which this index is moving is divided into zones limited by positions corresponding to the limit values of the factor for which at least one of the control or warning devices must be brought into or out of action.

In most cases, the space within which the index is moving is divided into only two zones the limit between which marks the position beyond which the operation of the system to be controlled becomes dangerous.

Opposite each of these zones, I provide a contact element mounted in a support having a reciprocating movement of a direction at least substantially perpendicular to the plane in which the index is moving.

The contact elements are arranged so that, when one of them has come into contact with the index, that is to say every time the index has moved beyond one of the limit positions into the zone corresponding to this contact element, or when the apparatus is started into operation while the index is in said zone, said contact element is retracted into the support, this retraction movement serving:

a. to operate a control or warning system if said zone is a danger zone, for instance;

b. to move said contact element away from the index, and thus to prevent it from repeatedly contacting it in the course of its alternating movement;

c. to cause the other contact elements to project sufficiently with respect to the support, into which they have been precedingly retracted as above indicated, so as thus to enable them to come into contact with the index if said index comes subsequently within their respective zone.

In the construction illustrated by the drawings, my device includes an index or pointer 1 mounted on pivots 2 and controlled by a measurement apparatus 3, for instance a galvanometer if the factor to be watched is a current intensity. Of course, this indication is given merely by way of example, and the factor might be any other physical magnitude measured by a suitable measurement apparatus.

It will be supposed that it is desired to switch on a signal electric bulb 4 when the intensity that is measured exceeds a critical value. Advantageously, galvanometer 3 is adjusted so that, for this critical value, index 1 is about at the middle point of the dial 5 along which it is moving. The adjustment of the galvanometer may be made once for all for such a limit value, or it may be made variable for a range of possible limit values, for instance by rotating the whole of the galvanometer through a predetermined angle about the axis of its index, or by inserting an adjustable resistance in its circuit.

I provide two contact elements one of which corresponds to intensities lower than the critical value and the other to intensities higher than this limit value.

Each of these contact elements is constituted by a small plate 6a, 6b, and these plates are slidably mounted in a common support 7. This support 7 is actuated by means for reciprocating it in a direction substantially perpendicular to the plane in which index 1 is moving and parallel to the direction in which plates 6a, 6b are slidable in said support.

Figure 7:
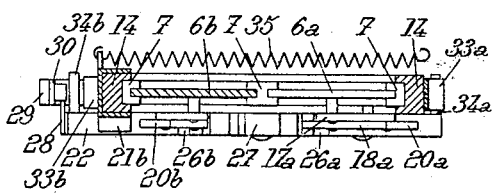
Fig. 7 is a sectional view on the line VII—VII of Fig. 6.

The means for reciprocating support 7 include, in the example shown by the drawing, an electric motor 8 on the shaft of which is fixed a pinion 9 meshing with a toothed wheel 10 (the whole of pinion 9 and wheel 10 forming a speed reducing unit) and a connecting rod 11 pivoted at one end to a crank pin 12 carried by wheel 10 and at the other end to a pin 13 carried by support 7. Support 7 is slidably guided in a frame 14 fixed in the casing 15 of the device, as shown in particular by Fig. 7. A slot 16 is provided in this frame for the passage of index 1.

I might of course use any other means for producing the desired reciprocating motion (magnetic sucking device or bi-metallic strip, pneumatic, hydraulic or other device). Anyway, it should be well understood that the reciprocating motion is not necessarily of fixed period. It may be determined by the opening and closing of a door, for instance when the illumination of a building is to be controlled by the value of the illumination indicated by a photo-electric cell, or by the passage of vehicles on a pedal located on the ground, by the movement of a machine the operation of which is to be controlled, and so on.

Two pairs of hinged arms 17a—18a and 17b—18b, the respective ends of which are pivoted to the plate elements 6a and 6b and to support 7, are interposed between said support and each of said plates. A pushing spring 19a—19b is provided to urge each plate element 6a, 6b toward index 1, the arrangement being however such that arms 17a—18b (or arms 17b and 18a) cannot come into line with each other. The lower arms 18a—18b are each provided with an extension 20a—20b forming a lug adapted to cooperate with an abutment 21a—21b carried by an arm 31a—31b pivoted at 32a—32b respectively to the fixed frame 14 as soon as the corresponding plate element 6a—6b is slightly pushed down in support 7.

A transverse sliding member 22 is carried by support 7 so as to be slidable thereon in a direction substantially perpendicular to that of the reciprocating movement of said support 7. For instance, said sliding member 22 is provided with slots 23a—23b cooperating with pins 24a—24b carried by support 7. The lower arms 18a—18b carry respective levers 25a—25b rigid therewith and engaged in recesses 26a—26b provided at the upper part of sliding member 22. Said levers and recesses are arranged in such manner that, when a plate element 6a—6b is moved down with respect to support 7, sliding member 22 is pushed by the corresponding lever 25a—25b toward the side of other plate element, a spring locking part 27 being advantageously provided resiliently to hold member 22 in either of its two extreme positions.

Each of the side abutments 21a—21b carries a downwardly extending spring plate 33a—33b adapted to cooperate with a pin 34a—34b of sliding member 22 as it will be hereinafter explained. A spring 35 urges abutment 21a and 21b toward each other.

Figure 3:
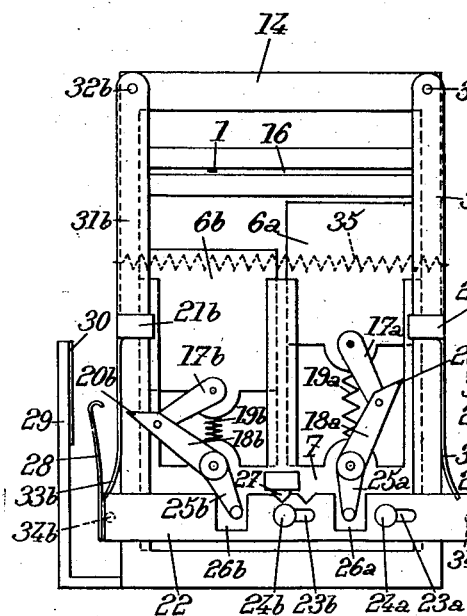
Figs. 3, 4, 5 and 6 are views on an enlarged scale showing the mechanism of the apparatus in different working positions of the elements thereof.
Figure 4:
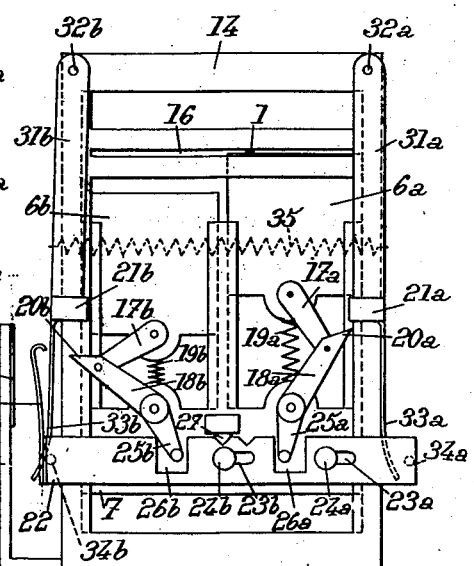
Figure 8:
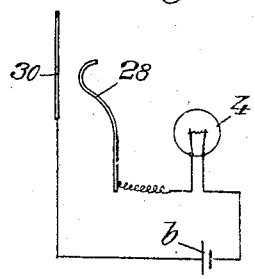
Fig. 8 is a diagrammatical view showing the electric layout of the device.

Signal lamp 4 is arranged to be switched on or off according to the position of member 22. For this purpose, as shown by Fig. 8, the electric circuit of said lamp, including battery b, is connected on the one hand to an elastic conductor element 28 carried by sliding member 22 and, on the other hand, to a conductor element 30 carried by a part 29 rigid with frame 14. For one of the limit positions of sliding member 22 (as shown by Figs. 3 and 4), conductor element 28 is out of contact with conductor element 30. In the other position of plate 22 (illustrated by Figs. 5 and 6), conductor element 28 is in contact with conductor element 30 and circuit 28, 4, b and 30 is closed so that lamp 4 is switched on.

This device works in the following manner.

Supposing that index 1 is first on the left hand side of its guiding slot 16, as shown by Fig. 3. In this position, plate 6b is held in retracted (lower) position by the fact that lever 25b is bearing against the left-hand edge of the recess 26b of sliding member 22. Plate 6a is free to reciprocate vertically as a result of the reciprocating movement of support 7. Sliding member 22 is in its right hand side position with respect to support 7 so that spring plates 33a and 33b are both on the left hand side of the respective pins 34a and 34b with which they are to cooperate.

If, now, index 1 passes from the left hand side to the right hand side of its guiding slot 16, plate 6a on the next upward stroke thereof comes into contact with said index 1, as shown by Fig. 4. Plate 6a is therefore stopped in its upward movement, whereas support 7 keeps moving upwardly. As a consequence of this, the angle made by arms 17a and 18a with each other is slightly reduced and the nose or extension 20a or arm 18a projects toward the right-hand side of support 7.

During the upward movement of support 7, pin 34b, sliding along the right hand side of spring plate 33b pushes it toward the left so that abutment 21b is moved transversely toward the left. This abutment 21b pulls, through spring 35, abutment 21a toward the left, thus keeping it in its limit left hand-side position as shown by Fig. 3. As the spring plate 33a of this abutment 21a is now on the left hand side of pin 34a, the upward movement of support 7 (and pin 34a) does not interfere, i. e. does not tend to move abutment 21a.

Figure 5:
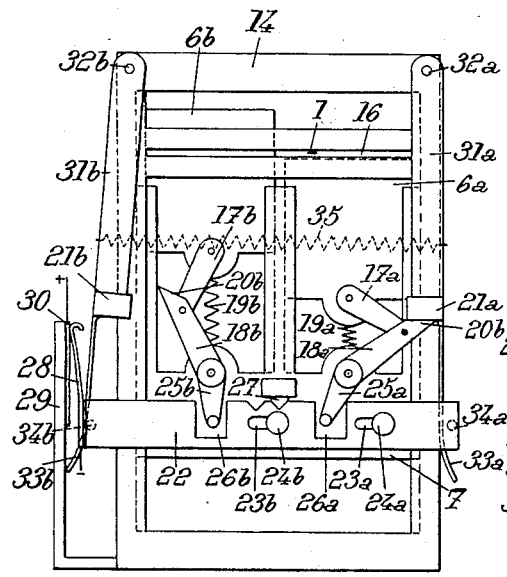

As support 7 keeps moving upwardly, the extension 20a of arm 18 engages under projection 21a and slides toward the right along the under face of said abutment 21a, as shown by Figs. 4 and 5. Plate 6a is thus caused to retract downwardly with respect to support 7. At the same time, lever 25a comes into contact with the left-hand side of the recess 26a of sliding member 22 and causes said plate to move toward the left against the resistance of resilient locking means 27. At the end of this leftward movement of member 22 under the action of lever 25a, the point of the wedge-shaped resilient locking means 27 is just on the edge of recess 27a and the spring which urges locking wedge 27 downwardly causes sliding plate 22 to move further toward the left until locking wedge 27 fully engages the corresponding recess 27a (Fig. 5). At this time, the right-hand edge of recess 26a has come into contact with lever 25a, thus holding arm 18a in the position shown by Fig. 5. Therefore, as long as these conditions prevail, the system of arms 18a—17a will be kept in the position shown in Fig. 5 and plate 6a will be held in retracted position.

When sliding member 22a was moved toward the left by lever 25a, the recess 26b of this plate ceased to hold by its left hand edge lever 25b in the position of Figs. 3 and 4 and therefore released this lever. Under the effect of spring 19b, plate 6b was then pushed upwardly and could come into the position shown by Fig. 5. In the course of this movement, abutment 21b was out of the way of the extension 20b of arm 18b because spring plate 33b, pushed by pin 34b, was then pulling said abutment 21b toward the left. From this time on and as long as index 1 remains in the right hand side zone of slot 16, the reciprocating movements of plate 6b can take place freely, whereas plate 6a remains in retracted position as shown by Fig. 6.

Figure 6:
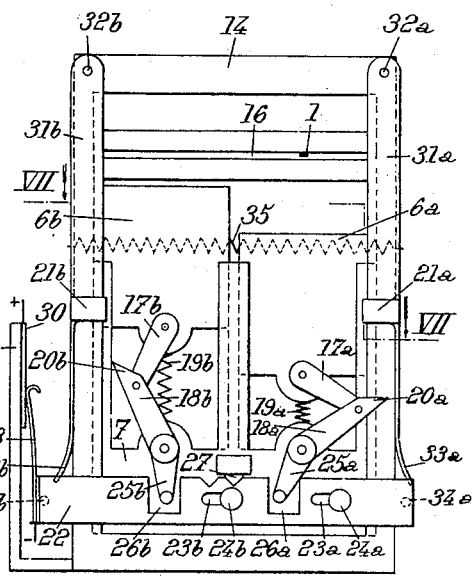

When sliding member 22 is in the position of Figs. 5 and 6, spring conductor 28 has come into contact with fixed conductor 30 and the circuit of the signal lamp is closed, thus warning the operator that the value of the factor above referred to corresponds to the presence of index 1 in a given zone of its displacement.

Of course, the movement of sliding plate 22 might be used to operate a control device acting on the system which determines the value of the factor measured by index 1, instead of merely operating a signal lamp or the like.

It is pointed out that, owing to the arrangement above described, plates 6a and 6b come into contact with index 1 only for an extremely short time and as soon as this contact has taken place, the plate which has made it is retracted and no longer comes to strike the index on every reciprocation of support 7. Thus my apparatus is very sensitive, without any risk of damaging the index 1 of the measurement apparatus.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A device of the type described which comprises, in combination, a movable index indicating by its position the value of a given factor, at least two elements each movable across a distinct portion of the path of travel of said index, means for reciprocating each of said elements to intersect said path of travel, means responsive to contact of any of said elements with said index for retracting said element and stopping its reciprocating movement while releasing the other element precedingly retracted, and signal means operative by at least one of said elements in the retracted position thereof.

2. A device of the type described which comprises, in combination, a frame, an index movable in said frame to indicate by its position the value of a given factor, at least one support mounted reciprocable in said frame in a direction transverse to the path of travel of said index, at least two plates slidable in said support in planes parallel to the direction of reciprocation thereof and intersecting the path of travel of said index so that, for two given ranges of displacement of said index, said plates meet said index, respectively, spring means interposed between said support and each of said plates for urging said plates toward said index, a pair of arms pivoted to each other in scissors-like fashion about an axis at right angles to one of said plates and pivoted at their free ends to said support and to said last mentioned plate respectively, the arm which is pivoted to said support including an extension beyond the axis of pivoting of said two arms together, an abutment carried by said frame adapted to cooperate with said arm extension when the corresponding plate moving toward said index touches it, whereby said two arms pull said last mentioned plate away from said index immediately after said plate has touched said index, another pair of arms similar to those of the first mentioned pair and similarly disposed between said support and the other plate and an abutment carried by said frame to cooperate with the extension of the arm of said second mentioned pair of arms which is pivoted to said support, the corresponding arms of said two pairs being inclined in opposed directions with respect to the direction of reciprocation of said support, a member slidable in said support at right angles to said direction, said member being provided with two recesses, levers rigid with the respective arms pivoted to said support, said levers being engaged in said recesses, means for yieldingly locking said member with respect to said frame in either of two positions, said levers being arranged to cooperate with respective edges of said recesses to shift said member from one of said positions to the other in response to the engagement of one of said arm extensions with the corresponding abutment, the other edge of each of said recesses being adapted to keep the corresponding lever in the position it occupies immediately after it has been shifting said member, against the action of the corresponding spring, and cooperating signal means carried by said frame and said member arranged to be operated when said member is in one of said two positions thereof.

3. A device according to claim 2 in which said abutments are movable with respect to said frame within limits, in a direction transverse to the direction of reciprocating movement of said support, said abutments being located on opposite sides of said frame, and means operatively connecting said abutments with said slidable member to move outwardly the abutment toward the side of which said slidable member has been shifted.

References Cited in the file of this patent

UNITED STATES PATENTS

| Number | Name | Date |
|---|---|---|
| 1,939,368 | Rydmark et al. | Dec. 12, 1933 |
| 2,516,750 | Brower | July 25, 1950 |